(No Model.)
W. H. ROBERTS.
BUTTER PACKAGE.
No. 380,219. Patented Mar. 27, 1888.
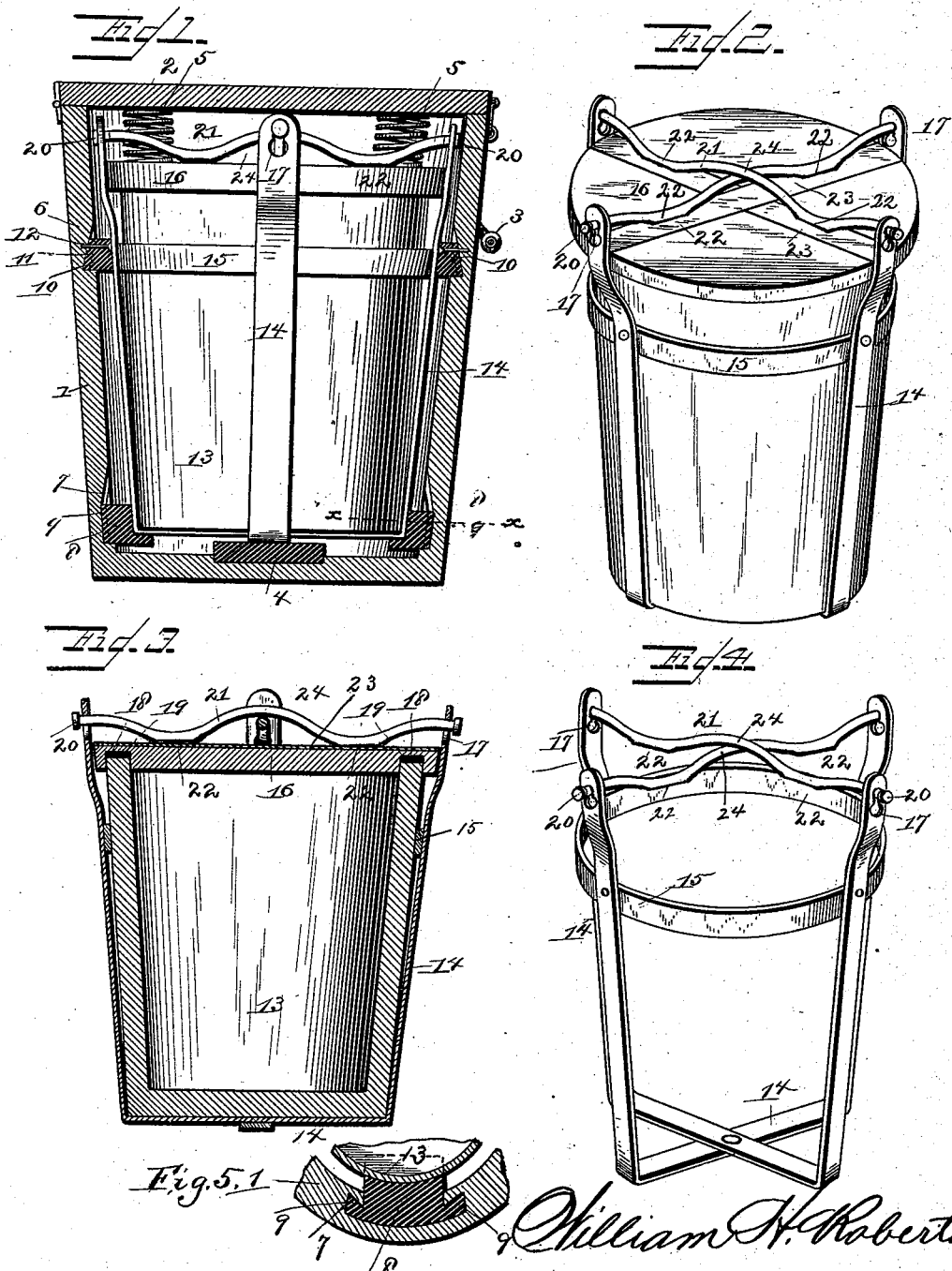
WITNESSES.
F. L. Ouvard
Benj. G. Cowl
INVENTOR.
William H. Roberts,
by Louis Bagger & Co.
Attorneys

UNITED STATES PATENT OFFICE.

WILLIAM H. ROBERTS, OF DAVENPORT CENTRE, NEW YORK.

BUTTER-PACKAGE.

SPECIFICATION forming part of Letters Patent No. 380,219, dated March 27, 1888.

Application filed December 27, 1887. Serial No. 259,079. (No model.)

*To all whom it may concern:*

Be it known that I, WILLIAM H. ROBERTS, a citizen of the United States, and a resident of Davenport Centre, in the county of Delaware and State of New York, have invented certain new and useful Improvements in Butter-Packages; and I do hereby declare that the following is a full, clear, and exact description of the invention, which will enable others skilled in the art to which it appertains to make and use the same, reference being had to the accompanying drawings, which form a part of this specification, and in which—

Figure 1 is a vertical sectional view of the outer casing of my improved butter-package, showing the jar in side view. Fig. 2 is a perspective view of the jar and its fasteners. Fig. 3 is a vertical sectional view of the same. Fig. 4 is a perspective view of the fasteners detached from the jar, and Fig. 5 is a sectional detail view taken on line $x$ $x$ in Fig. 1.

The same numerals of reference indicate the same or corresponding parts in all the figures.

My invention has relation to packages for butter and similar articles or products; and it consists in the improved construction and combination of parts of such a package, as hereinafter more fully described and claimed.

In the accompanying drawings, the numeral 1 indicates the outer casing of the package, which is of the same shape as a common pail, and provided with a suitable lid or cover, 2, and a bail or handle, 3, for transporting and carrying it. The bottom of the outer casing has a central block or cushion, 4, of rubber or similar elastic material, and the cover is provided with two or more coil-springs, 5, near the edge of the under side. The inside of the casing has an upper and a lower series of dovetailed recesses, 6 and 7, the said recesses being near the upper and lower edges of the side, and being usually about three in number for each series, placed at equal distances from each other. Stepped blocks or cushions 8, of rubber or similar elastic material, are secured with their inner dovetailed edges, 9, in the lower series of recesses, while inclined blocks or cushions 10 are secured with their inner dovetailed edges, 11, in the upper recesses, having nails 12 passed through their upper ends for further security.

The bottom of the jar 13, which contains the butter, rests upon the central block in the bottom of the casing, and the edges of the bottom of the jar rest upon the steps of the lower blocks, while the sides bear against the inclined blocks, the said blocks supporting the jar firmly in the casing.

Bails 14 cross each other, with their doubled ends under the bottom of the jar at right angles to each other, and the upper portions of the upright legs of the bails are secured to a ring, 15, passing around the jar near the upper edge, the bails and the ring being made of any suitable metallic straps. The upper ends of the upright portions of the bails, which ends project above the lid or cover 16 of the jar, are formed with key-hole-shaped slots 17, having the enlarged portions at the lower ends.

The lid or cover is formed with an annular recess or groove, 18, in its under side, in which the upper edge of the jar may fit, and an elastic gasket or ring, 19, is secured in this groove, serving to form a tight packing for the edge of the jar and the cover.

The headed ends 20 of bulged or waved rods 21 may be inserted through the larger ends of the slots in the ends of the bails, and may slide up in the narrower portions of the slots, and these rods are formed with flat downward bulges 22, which may bear against strips 23, inserted in the upper side of the cover, and upward bulges 24, which may serve as handles for tilting the rods, so as to bring the flat bulged portions to bear firmly against the cover, one of the upward bulges being higher than the other, so that the rods may fit one under the other. It will thus be seen that when the bulged rods are tilted so as to bring the flat bulges to bear against the upper side of the cover the latter is forced firmly down upon the upper edge of the jar and will close the jar tightly. The frictional contact of the flat portions of the bulges of the rods retains them in position, and when the bulged rods are tilted flat upon the top of the cover the headed ends of the rods may be removed from the slots in the ends of the bails, and the jar may be opened.

The strips in the upper side of the cover will prevent the bulges of the metallic rods from wearing the cover, which is preferably made of wood, and the ring will serve to keep the upright portions of the bails in their proper positions when the jar is removed from the frame formed by the bails.

The lower doubled ends of the bails will be supported by the block in the bottom, which will prevent the frame from dropping down when the rods are removed from the slots in the ends of the bails, and the coil-springs in the lid or cover of the outer casing will bear against the jar-cover and hold the jar firmly within the casing, thus preventing any up-and-down movement therein.

Having thus described my invention, I claim and desire to secure by Letters Patent of the United States—

1. In a butter-package, an outer casing having dovetailed recesses arranged in an upper and a lower series upon the inner side of the casing, and having stepped and dovetailed blocks or cushions secured in the lower recesses and inclined and dovetailed blocks or cushions secured in the upper recesses, and having a central block or cushion in the bottom and coil-springs upon the inner side of the cover or lid of the casing, as shown and set forth.

2. In a butter-package, the combination of a jar, a cover having an annular groove in its under side provided with an elastic gasket and fitting over the rim of the jar and provided with wearing-strips inlaid in the upper side of the cover, two bails crossing each other, with their lower doubled ends under the bottom of the jar, and having their upper portions connected by a ring, and having key-hole-shaped slots in their upper ends, and cam-rods having their headed ends secured in the slots in the bails, and having flat downward bulges bearing against the wearing-strips of the lid, and having upward central bulges crossing one above the other, as shown and described.

3. In a butter-package, the combination of a pail-shaped outer casing having a bail and a suitable hinged cover and formed with dovetailed recesses in the inner side near the upper and lower edges of the side, stepped and dovetailed elastic blocks secured in the lower recesses, inclined and dovetailed elastic blocks secured by nails in the upper recesses, a central block in the bottom of the casing, coil-springs in the under side of the cover, a frame or cage formed by bails having eyed upper ends, a jar resting in the frame or cage and having a removable cover, and cam-rods having their ends inserted in the eyed upper ends of the bails, fastening the cover of the jar, as shown and set forth.

In testimony that I claim the foregoing as my own I have hereunto affixed my signature in presence of two witnesses.

WILLIAM H. ROBERTS.

Witnesses:
MORRELL BURRELL,
CLIFTON JAY MOREHOUSE.